US007192042B2

(12) United States Patent
Cerreto

(10) Patent No.: US 7,192,042 B2

(45) Date of Patent: Mar. 20, 2007

(54) ADJUSTABLE SEATING SYSTEM

(75) Inventor: Matthew R. Cerreto, Oberlin, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 10/540,744

(22) PCT Filed: Mar. 11, 2003

(86) PCT No.: PCT/US03/07414

§ 371 (c)(1),
(2), (4) Date: Jun. 24, 2005

(87) PCT Pub. No.: WO03/077817

PCT Pub. Date: Sep. 25, 2003

(65) Prior Publication Data

US 2006/0066143 A1 Mar. 30, 2006

Related U.S. Application Data

(60) Provisional application No. 60/364,301, filed on Mar. 13, 2002.

(51) Int. Cl.
*B62M 1/14* (2006.01)

(52) U.S. Cl. ................................ 280/250.1; 280/304.1

(58) Field of Classification Search ............. 280/250.1, 280/304.1, 65.1; 297/301.1
See application file for complete search history.

(56) References Cited

U.S. PATENT DOCUMENTS 2,236,089 A * 3/1941 Ducavich .................... 297/376
2,792,876 A * 5/1957 Emary ........................ 297/364
4,500,102 A * 2/1985 Haury et al. ............. 280/304.1
4,592,570 A 6/1986 Nassiri
4,721,321 A 1/1988 Haury et al.
5,152,543 A 10/1992 Sims et al.
5,263,768 A * 11/1993 Scheulderman ........ 297/362.13
5,364,165 A * 11/1994 Okamoto .................... 297/364
5,590,893 A 1/1997 Robinson et al.
5,997,021 A 12/1999 Robinson et al.
6,015,189 A 1/2000 Broadhead et al.
6,027,132 A 2/2000 Robinson et al.
6,264,218 B1 7/2001 Slagerman
6,264,225 B1 7/2001 Kunishige et al.
6,311,999 B1 * 11/2001 Kueschall ................ 280/250.1

FOREIGN PATENT DOCUMENTS

NZ 333427 5/2000

OTHER PUBLICATIONS

PCT application No. PCT/US03/07414 International Search Report completed Jun. 13, 2003.
Examination report from New Zealand application No. 534686.

* cited by examiner

*Primary Examiner*—Tony Winner
(74) *Attorney, Agent, or Firm*—Calfee, Halter & Griswold LLP

(57) ABSTRACT

A wheelchair includes a seat back and a frame rail. The seat back can be moved relative to the frame rail between a folded position and an unfolded and locked position. A first releasable locking mechanism releasably locks the seat back in the unfolded and locked position. A second releasable locking mechanism releasably locks the seat back at any selected one of a plurality of different angles relative to the frame rail. The seat back can be folded and unfolded without adjusting the seat back angle. The seat back has a portion that slides along the frame rail as the seat back angle is adjusted. The length of the seat back varies as the seat back angle is adjusted. The seat back includes a back cane that is pivotally connected with the frame rail by a pivot bracket. The back cane is fixedly connected to the pivot bracket. The pivot bracket pivots relative to the frame rail when the seat back is moved from the unfolded position to the folded position.

8 Claims, 8 Drawing Sheets

ADJUSTABLE SEATING SYSTEM

RELATED APPLICATION

This application claims the benefit of U.S. Provisional Application No. 60/364,301 filed Mar. 13, 2002.

FIELD OF THE INVENTION

The present invention is directed to wheelchairs and, more particularly, to seating systems for wheelchairs.

BACKGROUND OF THE INVENTION

Adjustable seating systems are important features of wheelchairs. The adjustability of such seating systems allows a user of the wheelchair to adjust various aspects of the seating system in order to provide the most comfortable seating arrangement. However, prior art adjustable seating systems suffer from several disadvantages. For example, some adjustable seating systems require the use of tools and detailed instructions typically only found in the wheelchair owner's manual to affect a seat adjustment. Such systems are often confusing and non-intuitive to the wheelchair user. Other adjustable seating systems do not provide independent adjustability. For example, some adjustable seating systems provide a folding seat back mechanism that, when used, changes or resets other adjustable seating system features such as the seat-back angle adjustment.

U.S. Pat. No. 6,311,999 discloses a wheelchair seat in which the angle of the seat back is adjustable relative to the seat bottom cushion, and the seat back can be folded down flat (forward) onto the seat bottom cushion, while retaining the seat back adjustment angle.

SUMMARY OF THE INVENTION

The present invention relates to a wheelchair that includes a seat back and a frame rail. The seat back can be moved relative to the frame rail between a folded position and an unfolded and locked position. A first releasable locking mechanism releasably locks the seat back in the unfolded and locked position. A second releasable locking mechanism releasably locks the seat back at any selected one of a plurality of different angles relative to the frame rail. The seat back can be folded and unfolded without adjusting the seat back angle.

The seat back has a portion that slides along the frame rail as the seat back angle is adjusted. The length of the seat back varies as the seat back angle is adjusted. The seat back includes a back cane that is pivotally connected with the frame rail by a pivot bracket. The back cane is fixedly connected to the pivot bracket. The pivot bracket pivots relative to the frame rail when the seat back is moved from the unfolded position to the folded position.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION

Figure 1:
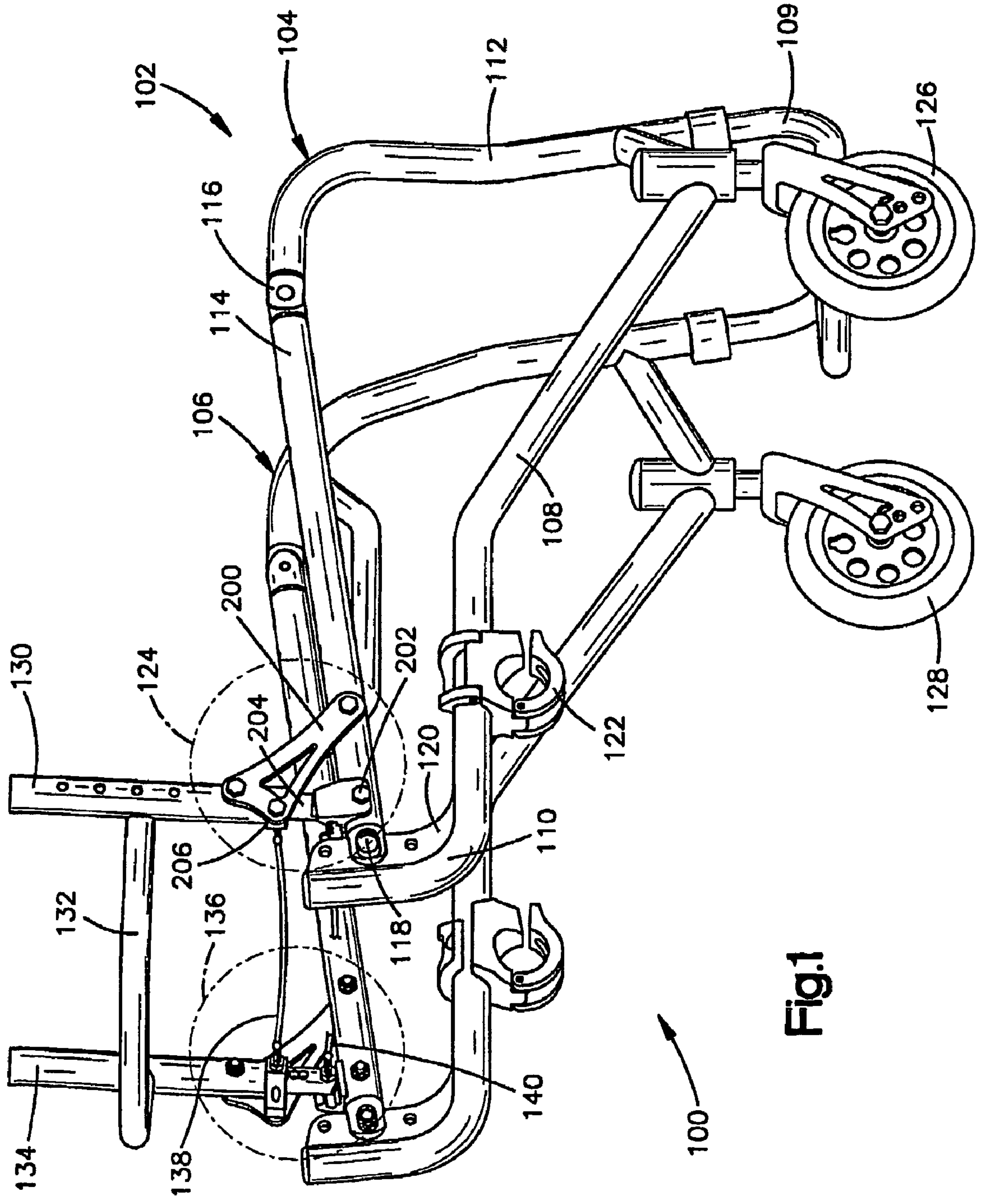
FIG. 1 is a perspective view of a portion of a wheelchair frame including a seat back adjustment mechanism in accordance with the present invention.

FIG. 1 is a perspective view of a wheelchair 100 incorporating one embodiment of a seat back fold-down and adjustable seat back angle mechanism in accordance with the present invention. Wheelchair 100 has a frame 102 that includes a first side frame 104 and a second side frame 106. Side frames 104 and 106 are mirror constructions of each other and, therefore, only side frame 104 will be discussed in particular with the understanding that the discussion equally applies to side frame 106.

Side frame 104 has frame portions 108, 110, and 112 collectively forming a lower side frame portion. Side frame 104 further has a frame portion 114 that is pivotally connected to frame portion 112 via pivotal connection 116. Frame portion 114 forms an upper side frame portion. Pivotal connection 116 has a pivot lug assembly that includes a pivot lug fork, pivot lug, and a pivot pin for inserting through the pivot lug fork and pivot lug. For example, one such suitable pivot lug assembly in described in U.S. Pat. No. 5,267,745 to Robertson et al., which is hereby fully incorporated by reference. Preferably, the pivot lug fork is rigidly attached to frame portion 112 and the pivot lug is rigidly attached to a first end of frame portion 114. Frame portion 114 further has a second end that includes fork member 118. Fork member 118 is configured to accept a seat-angle adjust plate 120 between its fork members. Seat-angle adjust plate 120 is rigidly affixed to frame portion 110 and includes a plurality of vertically spaced-apart mounting holes that are used to secure fork member 118 with a nut and bolt fastener. Configured as such, the angle of frame portion 114 can be adjusted by pivoting frame portion 114 about pivotal connection 116 and securing such angle by appropriately fastening fork member 118 to seat-angle adjust plate 120.

A clamp 122 is provided on frame portion 108 for attaching an axle tube thereto resulting in the axle tube being connected between side frames 104 and 106 by a similar clamp on side frame 106. One such suitable clamp and axle tube assembly is described in U.S. Pat. No. 5,851,018 to Curran et al., which is hereby fully incorporated by reference. The axle tube is used to secure the left and right-side drive wheels to wheelchair 100 for propulsion. The axle tube also provides additional rigidity to frame 102 between side frames 104 and 106. In this regard, a footrest 109 is also provided that interfaces with frame portion 112 and its equivalent in side frame 106 to provide further rigidity to wheelchair 100.

Wheelchair 100 further includes a seat back fold-down mechanism and an adjustable seat back angle mechanism, collectively shown as 124. Side frame 106 includes a similar seat back fold-down and adjustable seat back angle mechanism, collectively shown as 136, which is of mirror construction to seat back fold-down and adjustable seat back angle mechanism 124. In this regard, a seat back assembly 135 is provided that includes a seat back cushion (not shown) that is preferably removably affixed to a set of back canes 130 and 134. The seat back fold-down and adjustable seat back angle mechanisms 124 and 136 connect the back canes 130 and 134 to frame 102 via frame portion 114 and its equivalent in side frame 106. A handle bar 132 is provided between back canes 130 and 134 to provide rigidity between the back canes 130 and 134 and to enable folding the seat back toward the frame portion 114 or unfolding the seat back away from frame portion 114.

Figure 2A:
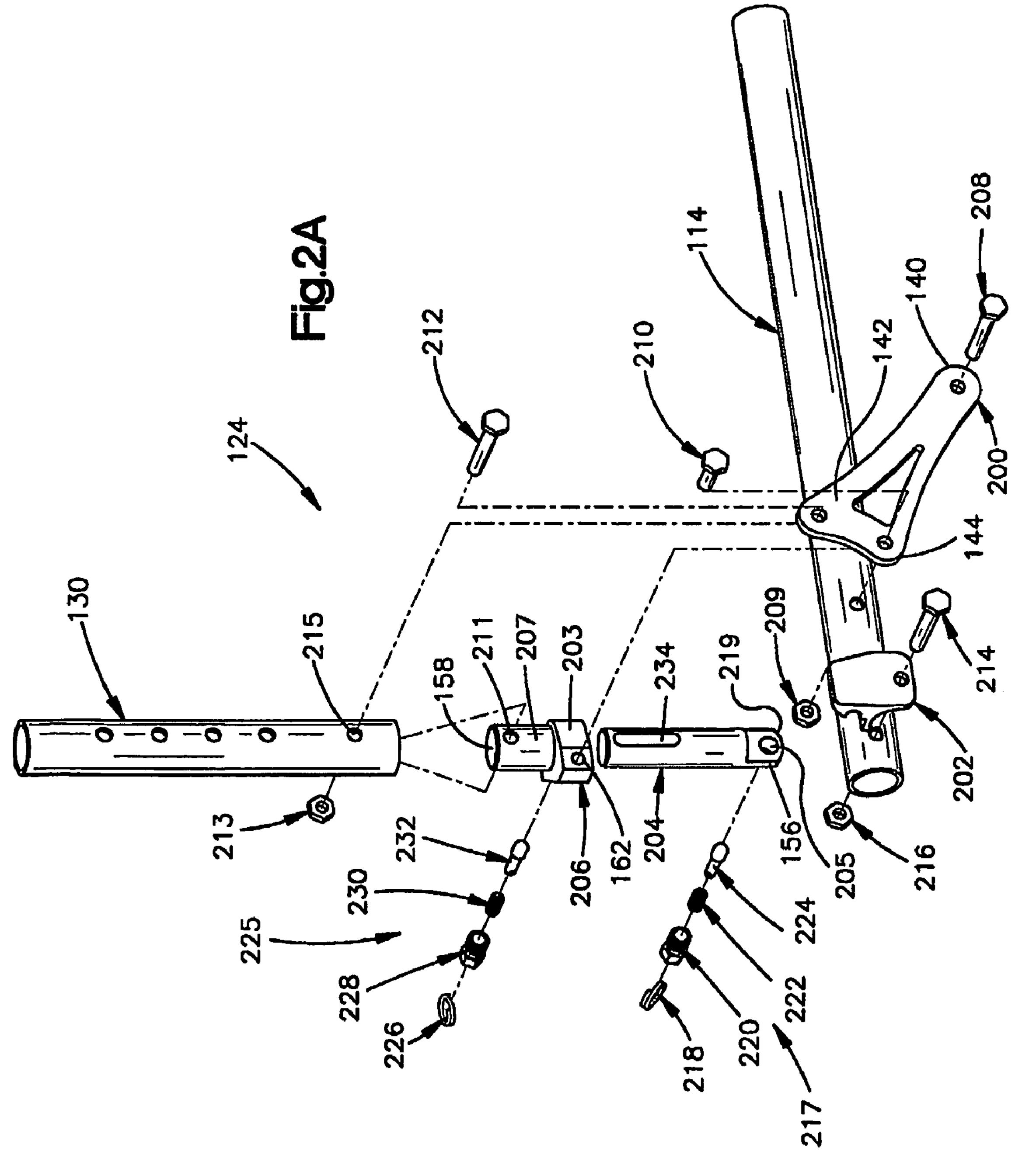
FIG. 2A is an exploded perspective view of the seat back adjustment mechanism.
Figure 2B:
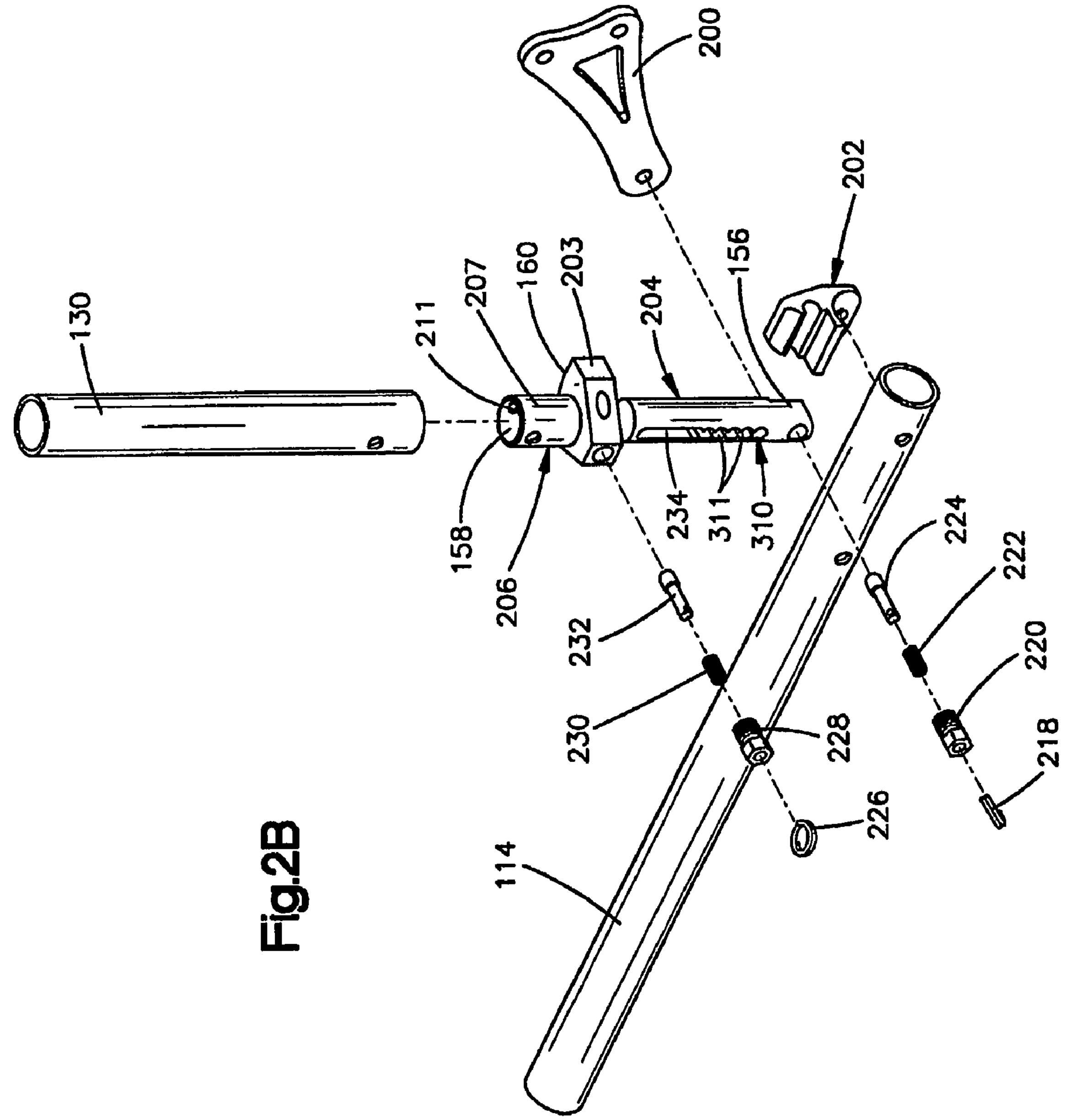
FIG. 2B is an exploded perspective view of selected parts of the seat back adjustment mechanism.

FIG. 2A shows an exploded view of the seat back 135 fold-down and adjustable seat back angle mechanism 124. FIG. 2B is a reverse-angle exploded perspective of FIG. 2A that further illustrates the features of the present embodiment. In FIG. 2B, the fasteners are not shown for the sake of clarity in illustrating the remaining components.

The seat back fold-down and adjustable seat back angle mechanism 124 includes a pivot bracket 200, a stop block 202, a back angle adjustment rod 204, and a bar-slide coupling 206. The seat back 135 includes the back cane 130 and the back cane adjustment rod 204 and the bar slide coupling 206.

The pivot bracket 200 (FIG. 2A) is an elongated triangular member having three vertices or end portions 140, 142 and 144. Each one of the vertices 140–144 of the pivot bracket 200 has a respective fastener opening in the form of a through hole.

The stop block 202 (FIGS. 3 and 4) is a solid member having an arcuate bearing surface 306 adapted to fit closely over the rail 114. The stop block 200 also has a pin channel 302 disposed above the bearing surface 306. The pin channel 302 extends in a front to back direction when the stop block 200 is mounted on the frame rail 114.

The stop block 200 further has a cam surface 304 disposed above the pin channel 302. The stop block 200 also has a planar bearing surface 308 that is disposed below the pin channel 302. The bearing surface 308 partially defines an adjustment bar channel 309, in the stop block 200, that extends parallel to the pin channel 302.

The back angle adjustment rod 204 is a solid member that has a longitudinally extending slot 234 that extends completely through (radially across) the rod. A stepped bore 310 extends downwardly from the slot 234. The bore 310 does not extend completely through (radially across) the rod 204, but instead is only present on one side (the inside) of the rod.

The stepped bore 310 comprises a plurality of interconnecting circular apertures 311 configured to receive a plunger pin. It should be understood that the particular geometry of bore 310 is not important so long as it is configured to allow a plunger pin to lock in a selected one of the apertures 311 of the bore 310. Hence, the bore 310 can be implemented using, for example, rectangular, square, oval, or triangular geometries.

The back angle adjustment rod 204 has a lower end portion 156. The lower end portion 156 of the back angle adjustment rod 204 includes a threaded bore 205 that extends completely through (radially across) the lower end portion. The lower end portion 156 has an arcuate lower end surface or bearing surface 219.

The bar slide coupling 206 has a hollow tubular configuration including a central passage 158 (FIGS. 2A and 2B) that extends completely through the bar slide coupling. The bar slide coupling 206 has a hollow tubular sleeve portion 207 with a radially extending fastener opening 211. A base portion 203 of the bar slide coupling 206 extends downward from the sleeve portion 207. The base portion 203 has on its outside a fastener opening in the form of a threaded bore 162. The base portion 203 has on its inside a fastener opening in the form of a threaded bore 166. The threaded bore 166 opens into the central passage 158 in the base portion 203 of the bar slide coupling 206.

In assembly of the mechanism 124, the sleeve portion 207 of the bar slide coupling 206 is inserted into the tubular lower end portion of the back cane 130. The fastener opening 211 in the sleeve portion 207 of the bar slide coupling 206 aligns with a fastener opening 215 in the back cane 130. The base portion 203 of the bar slide coupling 206 extends outside of and below the back cane 130.

The back angle adjustment rod 204 (FIGS. 2A and 2B) is slid into the passage 158 in the bar slide coupling 206. The upper slot 234 in the back angle adjustment rod 204 aligns with the opening 211 in the bar slide coupling 206. Portions of the back angle adjustment rod 204, including the stepped bore 310 and the bore 205, project downward out of the bar slide coupling 206.

The second or upper end portion 142 of the pivot bracket 200 is then placed adjacent to the back cane 130. A bolt 212 is placed through the fastener opening in the upper end portion 142 of the pivot bracket 200 and through the opening 215 in the back cane 130. The bolt 212 extends through the fastener opening 211 in the sleeve portion 207 of the bar slide coupling 206. The bolt 212 also extends through the upper slot 234 in the back angle adjustment rod 204.

A nut 213 is secured on the bolt 212. The upper end portion 142 of the pivot bracket 200, and the back cane 130, are thus permanently connected to each other by the bolt 212. The bolt 212 also secures the bar slide coupling 206 permanently in place in the lower end of the back cane 130.

The back angle adjustment rod 204 is supported for sliding movement in the bar slide coupling 206 and in the back cane 130. The engagement of the bolt 212 with the ends of the slot 234 prevents the back angle adjustment rod 204 from coming out the back cane 130.

Separately, the first or forward end portion 140 of the pivot bracket 200 is secured to the frame rail 114, at a location forward of the upper end portion 142, by a forward bolt 208 and a nut 209. The pivot bracket 200 is thus supported on the rail 114 for pivotal movement relative to the rail about the forward bolt 208. As a result, the lower end portion of the back cane 130, the bar slide coupling 206 and the back angle adjustment rod 204, which are connected with each other and with the upper end portion 142 of the pivot bracket 200 by the bolt 212, are also supported by the pivot bracket for pivotal movement relative to the rail 114 about the forward bolt 208.

Separately, the bar slide coupling 206 is secured to the pivot bracket 200 by a lower bolt 210. The lower bolt 210 extends through the fastener opening in the lower end portion 144 of the pivot bracket 200 and is screwed into the threaded bore 162 in the bar slide coupling 206. As a result, the pivot bracket 200 and the bar slide coupling 206 are permanently connected to each other by the lower bolt 210.

The pivot bracket 200 is thus secured to the bar slide coupling 206 by the lower bolt 208; is secured to the back cane 130 by the upper bolt 212; and is pivotally secured to the rail 114 by the forward bolt 208.

The assembly of the back cane 130 and the back cane adjustment rod 204 is connected with the pivot bracket 200 at two locations along its length, i.e., at the upper bolt 212 and the lower bolt 210. As a result, the back cane 130 and the back cane adjustment rod 204 are fixed to the pivot bracket for movement with the pivot bracket relative to the frame rail 114. The back cane 130 does not pivot relative to the pivot bracket 200.

Also separately, the stop block 202 is fixedly secured to the rail 114 by a bolt 214 and a nut 216, at a location rearward of the forward bolt 208. The curved bearing surface 306 on the stop block 202 overlies the curved outer surface of the rail 114. The pin channel 302 and the adjustment channel 309 on the stop block 202 are disposed above the rail 114. The flat bearing surface 308 on the stop block faces upwardly. The cam surface 304 on the stop block 202 also faces upwardly.

A lower plunger pin assembly 217 is mounted on the back angle adjustment rod 304. The lower plunger pin assembly 217 includes a pull ring 218, an externally threaded plunger housing 220, a compression spring 222, and a plunger pin 224. The plunger housing 220 is screwed into the threaded bore 205 in the lower end portion 217 of the back angle adjustment bar 204. As a result, the lower plunger pin assembly 217 is fixed in and movable with the back angle adjustment bar 204. The lower plunger pin assembly 217 constitutes a first releasable locking mechanism of the adjustment mechanism 124.

In assembly, the lower end portion 156 of the back angle adjustment bar 304, with the lower plunger pin assembly 217 affixed thereon, is positioned adjacent the stop block 202. The arcuate lower end surface 219 of the back angle adjustment bar 304 abuttingly engages the flat bearing surface 308 on the stop block 202 to transmit vertical load from the back cane 130 to the stop block 202 and thereby the frame rail 114.

The plunger pin 224 extends through the lower end portion 156 of the back angle adjustment bar 304 and into the pin channel 302 on the stop block 202. The engagement of the plunger pin 224 in the pin channel 302 of the stop block 202 prevents the back cane adjustment rod 204 from moving upwardly (as viewed in FIGS. 3 and 4) relative to and off the stop block. This prevents the back angle adjustment bar 304 from being pulled off the rail 114 and thus prevents the back cane 130 and the entire seat back from being folded forward onto the seat bottom cushion.

The wheelchair also includes an upper plunger pin assembly 225. The upper plunger pin assembly 225 includes a pull ring 226, an externally threaded plunger housing 228, a compression spring 230, and a plunger pin 232. The plunger housing 220 is screwed into the threaded bore 166 in the base portion 203 of the bar slide coupling 206. As a result, the upper plunger pin assembly 225 is fixed in and movable with the bar slide coupling 206. The upper plunger pin assembly 225 constitutes a second releasable locking mechanism of the adjustment mechanism 124.

The plunger pin 232 extends completely through the threaded bore 166 in the bar slide coupling 206 and radially into the passage 158 in the bar slide coupling. Because the back cane adjustment rod 204 extends axially through the passage 158 in the bar slide coupling 206, the plunger 232 pin thus extends radially into the stepped lower slot 310 of the back angle adjustment bar.

The plunger 232 pin is received in and engages in one of the apertures 311 of the lower slot 310 of the back cane adjustment rod 204. This engagement prevents the back cane adjustment rod 204 from moving vertically (axially), relative to and inside of, the bar slide coupling 206. Because the bar slide coupling 206 is fixed in position vertically in the back cane 130 by the bolt 212, the plunger pin 232 thus blocks axial movement of the back cane adjustment rod 204 in the back cane 130.

The upper plunger pin assembly 225 thus fixes the relative vertical position of the back cane adjustment rod 204 in the back cane 130. Selecting an opening 311 in the back cane adjustment rod 204 for receiving the plunger pin 232, as described below, can adjust the angle (tilt) of the seat back relative to the frame rails 114.

If it is desired to fold the seat back assembly forward onto the seat bottom cushion and frame rail 114 (see FIGS. 3–6), the pull ring 218 of the lower plunger pin assembly 217 is pulled away from its housing 220. The plunger pin 224 moves horizontally out of the pin channel 302 on the stop block, as is shown in FIG. 5. As a result, the pivot bracket 200 is freely pivotable relative to the frame rail 114 about the forward bolt 208. Thus, the back cane adjustment rod 130 and the back cane 204, which are connected with the pivot bracket 200 by the bolts 210 and 212, are free to move relative to the stop block 202 and, therefore, relative to the frame rail 114 on which the stop block is affixed. The seat back assembly, which remains pivotally connected to the rail 114 by the pivot bracket 200 and the bolt 208, can then be tipped forward, pivoting around the bolt 208. The parts move to the folded position shown in FIG. 6.

Figure 4:
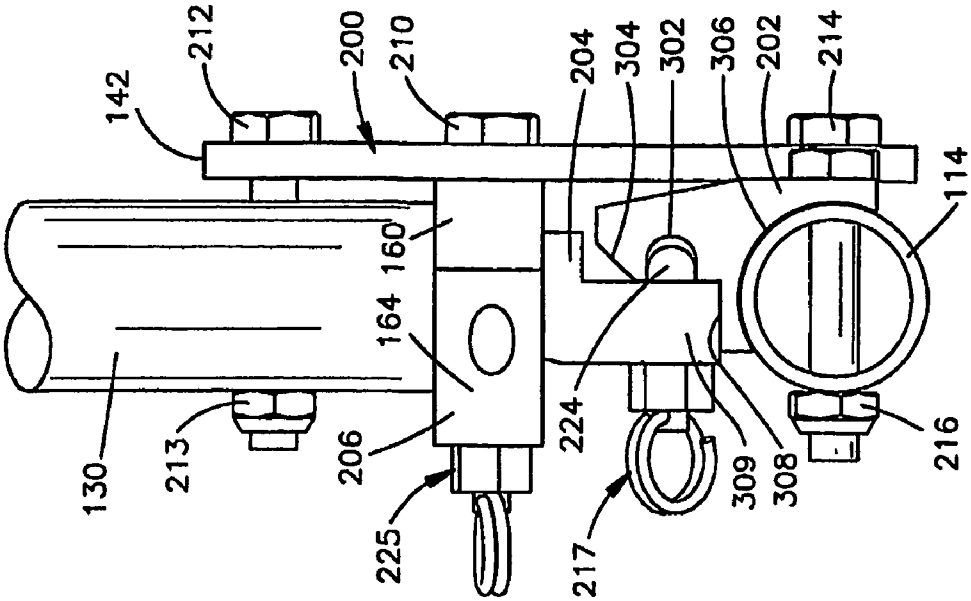
FIG. 4 is a rear elevational view of the seat back adjustment mechanism, shown in a first position.
Figure 3:
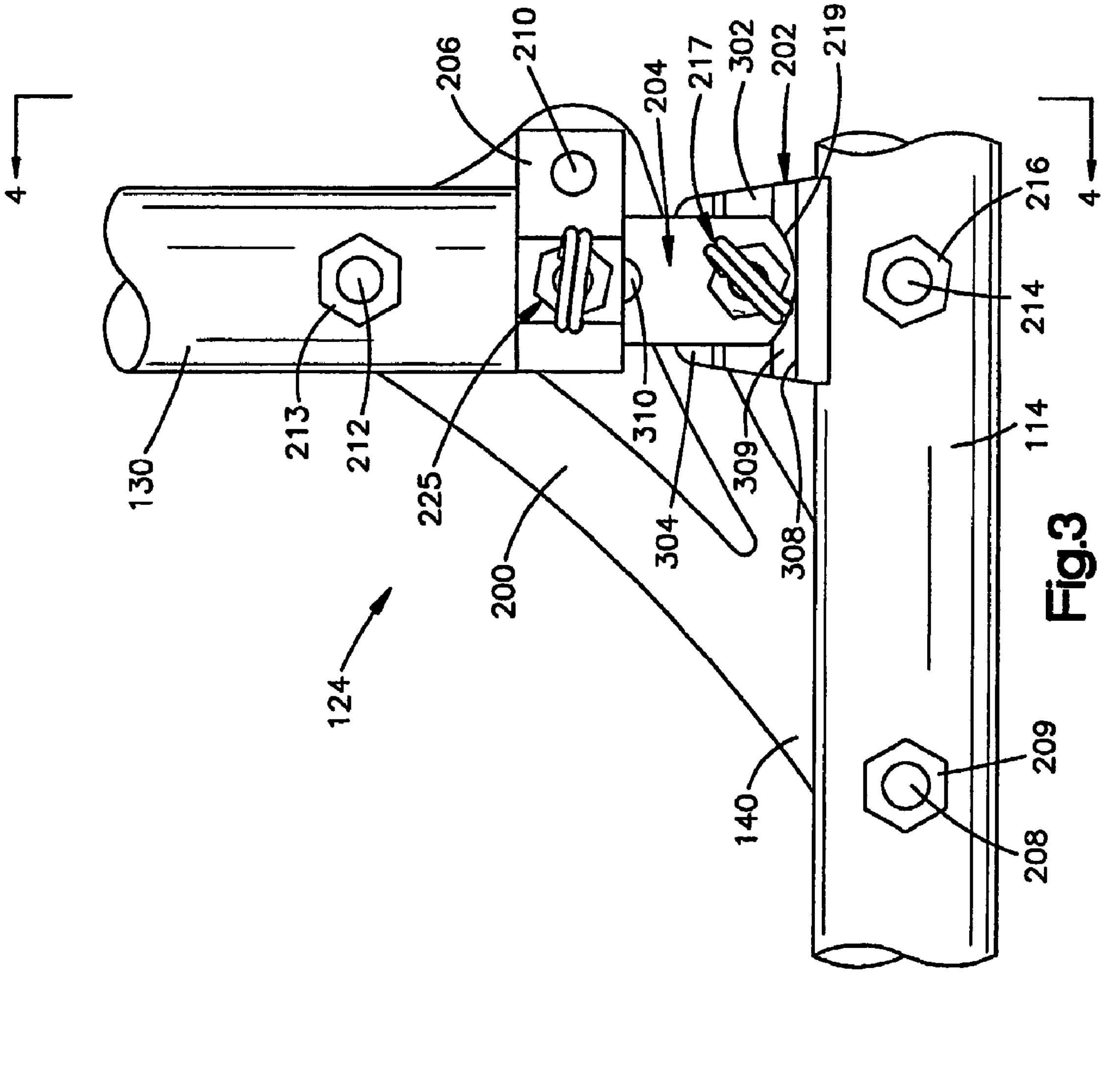
FIG. 3 is a side elevational view of the seat back adjustment mechanism, shown in a first position.
Figure 6:
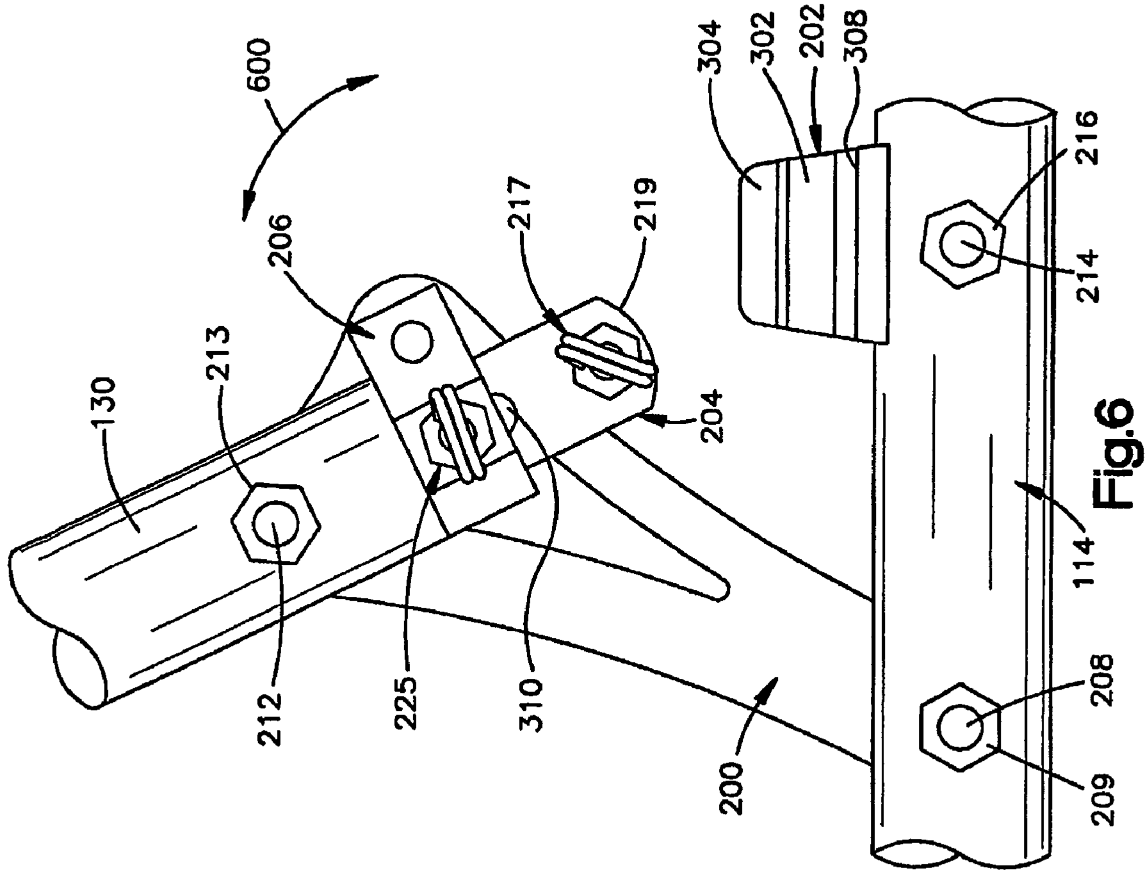
FIG. 6 is a side elevational view of the seat back adjustment mechanism, shown in the second or folded position.
Figure 5:
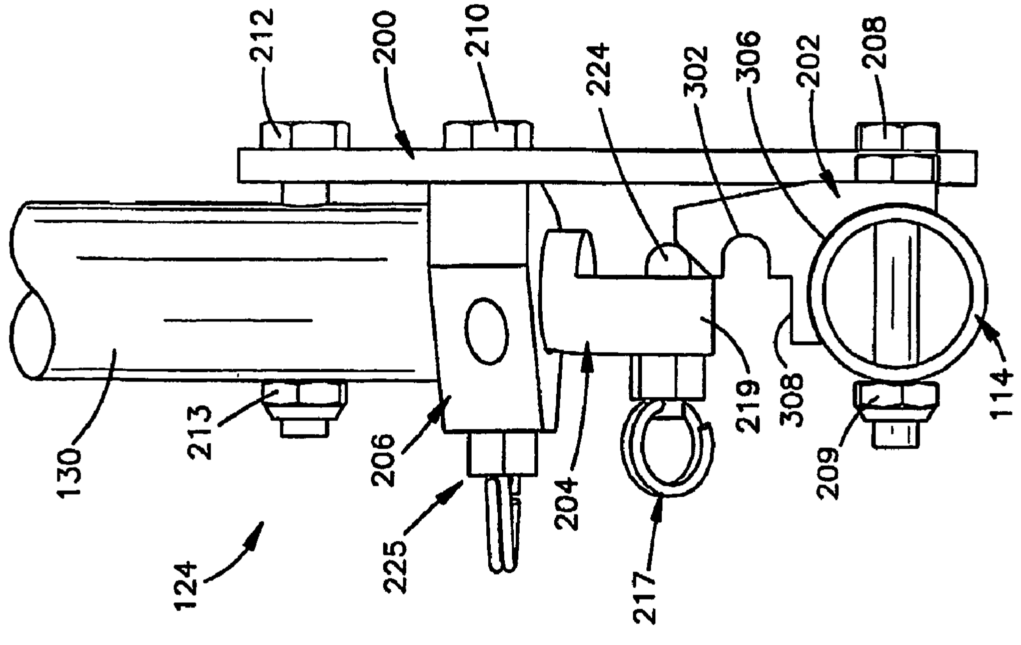
FIG. 5 is a view similar to FIG. 4 showing the seat back adjustment mechanism in a second or folded position.

To unfold and lock the seat back, the seat back assembly is moved back from the position shown in FIG. 6 to the position shown in FIGS. 3 and 4. As this movement occurs, the tip of the plunger pin 224 engages the cam surface 304 on the stop block 202. The cam surface 304 cams and retracts the plunger pin 224 into the housing 220 so that the plunger pin can move into a position laterally adjacent to the pin channel 302 in the stop block 202.

The plunger pin 224 enters vertically into the pin channel 302 on the stop block 202 and, under the force of the spring 222, is pushed outward of the housing 220 (horizontally) into engagement with the surfaces defining the pin channel in the stop block. The engagement of the plunger pin 224 in the pin channel 302 connects the lower plunger pin assembly 217 with the stop block 202. Because the lower plunger pin assembly 217 is secured to the back cane adjustment rod 204, this engagement also secures the back angle adjustment bar to the stop block 202. Because the back cane adjustment rod 204 is secured to the back cane 130, the back cane is thus secured to the stop block 202. The seat back assembly is thus unfolded and secured again to the rail 114 and can not be folded forward without locking again.

When the seat back assembly is, in this manner, being folded forward or back, the adjustment of the upper plunger pin assembly 225 in the stepped slot 310 is not affected. The plunger pin 232 remains fully in the selected aperture 311 of the stepped slot 310, without change. Thus, the angle of the seat back relative to the lower rail 114 is not affected The plunger pin 232 can selectively be placed in any one of the apertures 311 of the lower slot 310 of the back cane adjustment rod 204. When this occurs, the tilt of the seat back changes, thus changing the angle of the seat back relative to the seat bottom cushion.

Specifically, when the pull ring 226 of the upper plunger pin assembly 225 is pulled, the plunger pin 232 is pulled laterally out of the stepped bore 310 in the back angle adjustment bar 130. The assembly of the back cane 204 and the bar slide coupling 206 is then free to move vertically relative to the back cane adjustment rod 204, which is held in position on the frame rail 114 by the lower plunger pin assembly 217.

A downward force may be applied to the back cane 130, for example, through the handle bar 134 (FIG. 1). This force causes the back cane 130, the bar slide coupling 206, and the upper plunger pin assembly 225 to move downward in a telescopic fashion along the back cane adjustment rod 204.

Once the desired seat back angle is achieved, the plunger ring 226 is released and the plunger pin 232 is allowed to move back, under the force of the spring 230, into the selected aperture 311 of the stepped bore 310. This engagement locks the parts together and sets the angle of the seat back relative to the seat bottom cushion. It should be understood that an upward force could also be applied to the back cane 130, bar-slide coupling 206, and plunger pin assembly 225, resulting in an angle adjustment in the opposite direction.

Figure 8:
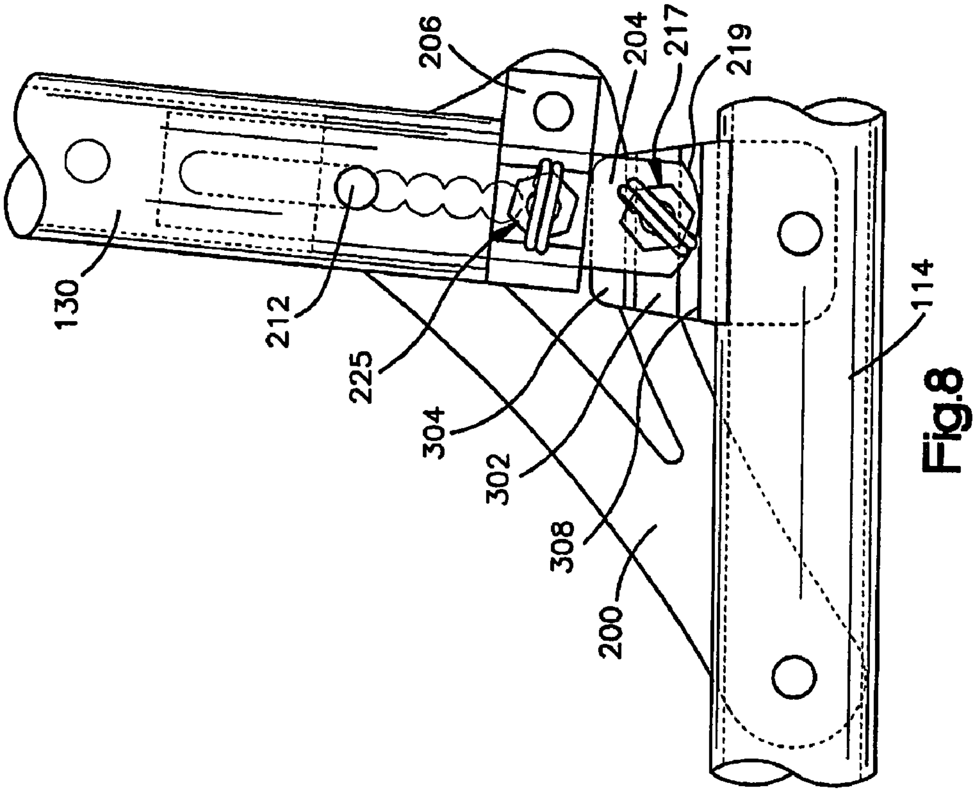
FIGS. 7–9 are a series side elevational views showing the seat back adjustment mechanism supporting the seat back in different angular orientations.
Figure 7:
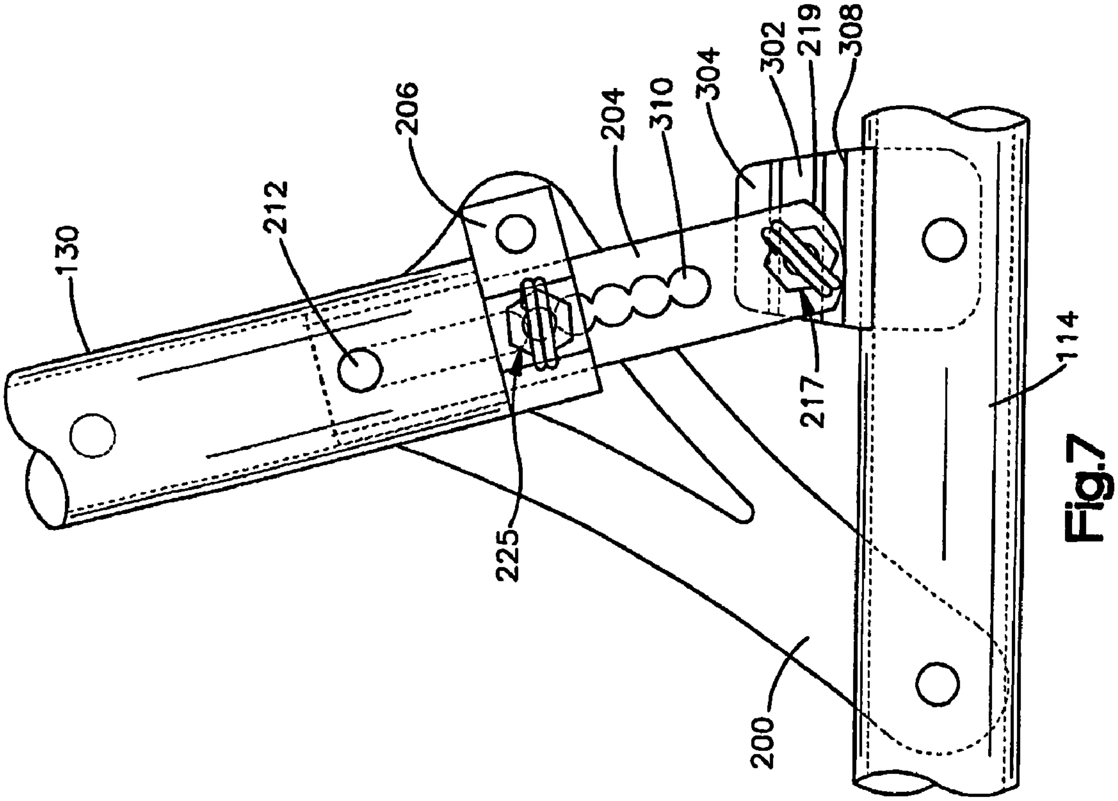
Figure 9:
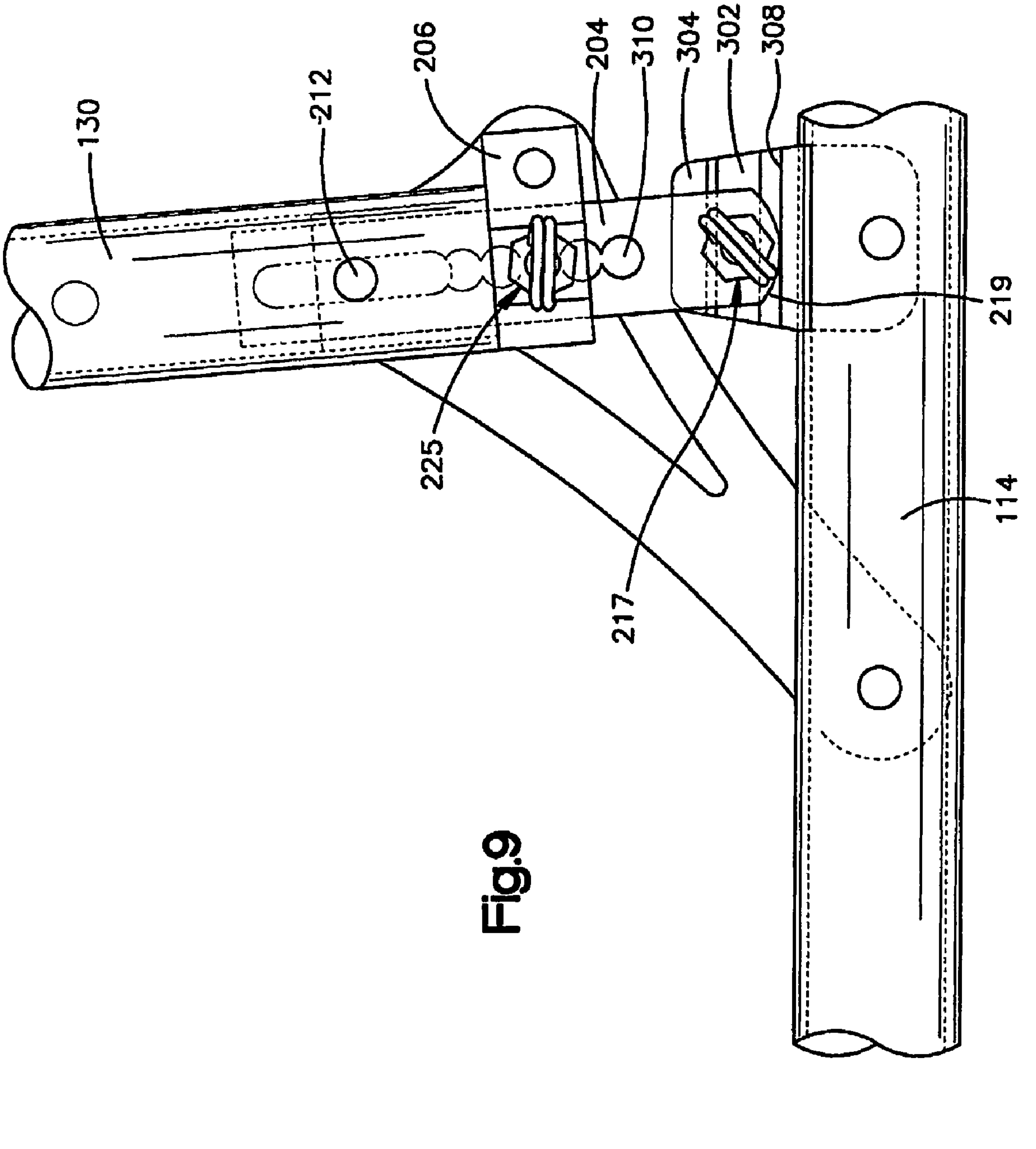
Figure 11:
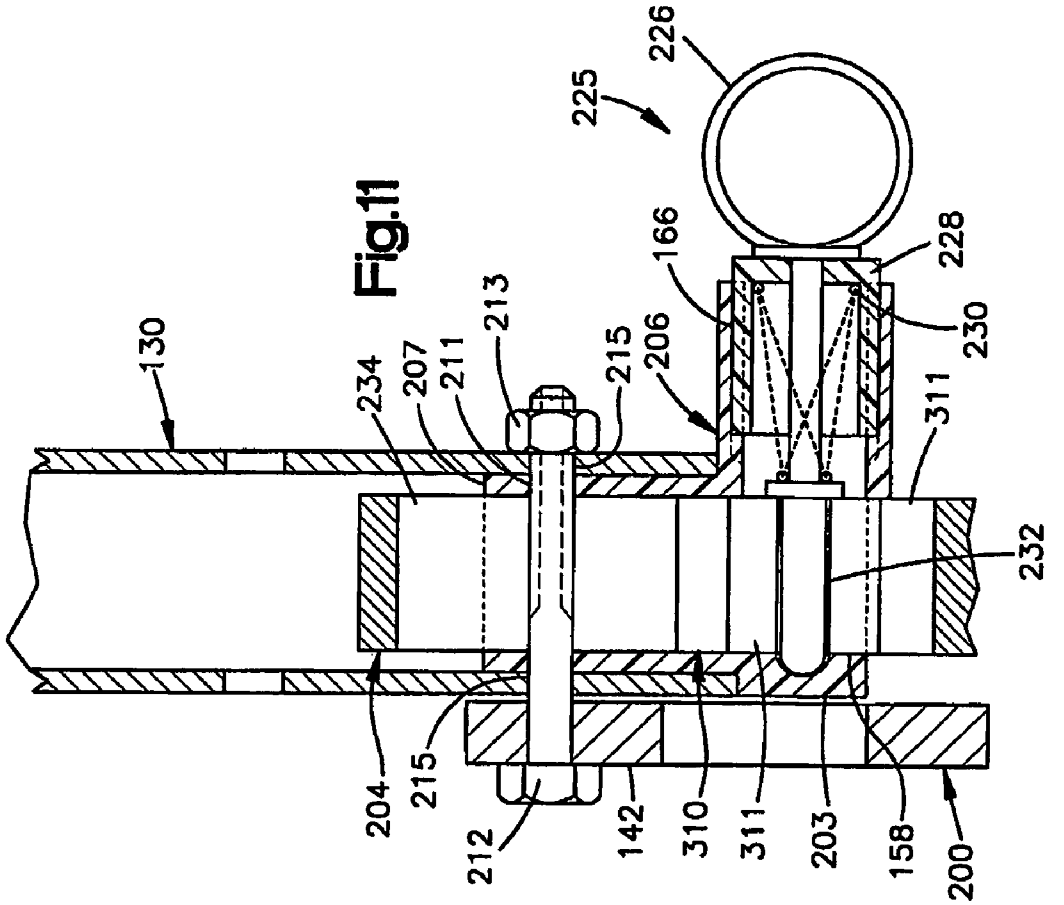
FIG. 11 is another sectional view of a portion of the seat back adjustment mechanism, taken along line 11—11 of FIG. 10.
Figure 10:
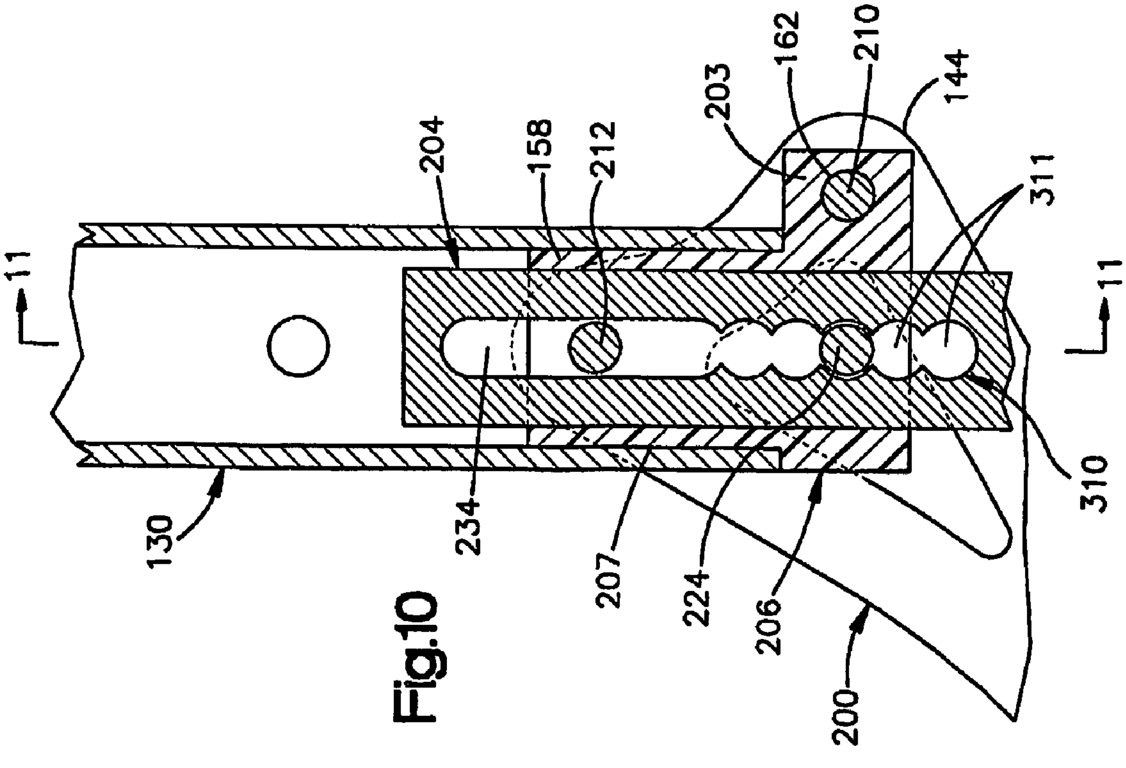
FIG. 10 is a sectional view of a portion of the seat back adjustment mechanism.

As the back cane 130 moves upward and downward along the back cane adjustment rod 204, the length of the seat back 135 varies, and the angle of the seat back including the back cane, relative to the frame rail 114, changes. This change occurs because the lower end portion 156 of the back cane adjustment rod 204 is blocked from vertical movement relative to the rail 114 by the engagement of the plunger pin 224 in the pin channel 302 of the stop block 202, The plunger pin 232 is, however, free to move laterally along the fore-and-aft length of the pin channel 302 in the stop block 202. Therefore, as the angle between the back cane 130 and the frame rail 114 is adjusted as described above, the pivot bracket 200 pivots relative to both the back cane 130 and the frame rail 114, as can be seen in the series of views shown in FIG. 7–9 showing different positions of such angular adjustment. The plunger pin 232 moves laterally along the length of the channel 302 in the stop block 202, as the lower end portion 156 of the back cane adjustment rod 204 slides forward or rearward in the channel 309 and along the bearing surface 306 of the stop block which is fixed to the rail 114. In addition, the bolt 212 moves vertically in the upper slot 210 in the back cane adjustment rod 204.

This adjustment of the angle of the seat back assembly is effected without detaching the lower plunger pin assembly 217 including the plunger pin 224 from the stop block 202 in the manner described above with reference to the fold-down feature of the wheelchair. Conversely, the fold-down feature can be utilized without affecting the particular setting of the seat back angle, because the plunger pin 232 remains in the selected aperture 311 in the stepped bore 310.

The bolt 212 extends completely through the upper slot 234 in the back cane adjustment rod 204, as well as through the fastener opening 215 in the back cane 130. The bolt 212 thus limits the extent of relative telescoping movement of the back cane adjustment rod 204 and the back cane 130, setting the extremes of such movement. The bolt 212 also prevents the back cane adjustment rod 204 from being pulled completely out of the back cane 130 when the plunger pin 232 is not engaged in any of the apertures 311 of the slot 310 of the back angle adjustment bar.

A pull cable 138 (FIG. 1) is provided between the respective lower plunger pin assemblies 217 of the two seat back fold-down mechanisms 124 and 136. By pulling on the pull cable 138 and simultaneously applying either an upward or downward force to the handlebar 132, a user can modify or change the seat back angle adjustment of the back canes 130 and 134. As such, the seat back angle adjustment function can be performed in a simple intuitive manner and without the use of tools.

Similarly, a pull cable 140 is provided between the upper plunger pin assemblies 225 of the two seat back fold-down mechanisms 124 and 136. By pulling on the pull cable 140 and simultaneously applying a forward force to the handlebar 132, a user can release the seat back canes 130 and 134 from their locked state and fold them down towards frame portion 114. As such, the seat back fold-down function can be performed in a simple intuitive manner and without the use of tools.

Hence, the illustrated embodiment of the present invention provides independent seat back fold-down functionality and seat back angle adjustment functionality. In particular, the seat back can be folded down, or raised from a folded down portion, without disturbing the seat back angle adjustment. Such a feature is accomplished by mounting or attaching the seat back angle adjustment mechanism to a pivot bracket that is incorporated into the seat back fold-down function. As the pivot bracket pivots to accomplish the fold-down function, the seat back angle adjustment mechanism undergoes a corresponding motion without a change in its adjustment setting.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, other type of releasable latches can be employed instead of plunger pins (e.g., nut and bolt fasteners), channel 302 in stop block 202 can have closed ends, and various components can be made to differing measurements or proportions than shown herein. Therefore, the invention, in its broader aspects, is not limited to the specific details, the representative apparatus, and illustrative examples shown and described. Accordingly, departures can be made from such details without departing from the spirit or scope of the applicant's general inventive concept.

The invention claimed is:

1. A wheelchair including:

a seat back;

a frame rail;

a seat back fold-down mechanism supporting said seat back for folding movement relative to said frame rail between a folded position and an unfolded and locked position, said seat back fold-down mechanism including a first releasable locking mechanism for releasably locking said seat back in the unfolded and locked position; and a seat back angle adjustment mechanism for adjusting the angle of said seat back relative to said frame rail when said seat back is in the unfolded and locked position, said seat back angle adjustment mechanism including a second releasable locking mechanism for releasably locking said seat back at any selected one of a plurality of different angles relative to said frame rail;

said seat back fold-down mechanism enabling folding movement of said seat back between the folded position and the unfolded and locked position without releasing said second releasable locking mechanism when said seat back is locked in any selected one of the plurality of different angles relative to said frame rail;

said seat back having a portion that slides along said frame rail as the seat back angle is adjusted.

2. A wheelchair as set forth in claim 1 wherein the length of said seat back varies as the seat back angle is adjusted.

3. A wheelchair as set forth in claim 2 wherein said seat back is pivotally connected with said frame rail by a pivot bracket, said seat back being fixedly connected to said pivot bracket, said pivot bracket pivoting relative to said frame rail when said seat back is moved from the unfolded position to the folded position.

4. A wheelchair as set forth in claim 1 wherein said first releasable locking mechanism includes a first plunger pin assembly having a plunger pin engageable in a track on said frame rail, and said second releasable locking mechanism includes a second plunger pin assembly having a plunger pin that is selectively engageable in any one of a plurality of spaced apertures on said seat back.

5. A wheelchair as set forth in claim 1 wherein the frame rail is a generally horizontal frame rail that does not pivot upon folding of the seat back, the wheelchair including a pivot plate that is pivotally joined to the frame rail and that supports the seat back for pivoting movement relative to the frame rail, the seat back portion sliding along the generally horizontal frame rail as the seat back angle is adjusted.

6. A wheelchair as set forth in claim 1 wherein the seat back portion that slides along the frame rail as the seat back angle is adjusted comprises a lower portion of the seat back, the seat back lower portion being supported on a track of the frame rail for sliding movement in a generally horizontal direction along the track and thus along the length of the frame rail as the seat back angle is adjusted.

7. A wheelchair as set forth in claim 6 wherein the first releasable locking mechanism includes a release pin that is supported on the lower portion of the seat back for movement with the seat back, the release pin having a portion that is slidably received in the track.

8. A wheelchair including:

a seat back;

a frame rail;

a seat back fold-down mechanism supporting said seat back for folding movement relative to said frame rail between a folded position and an unfolded and locked position, said seat back fold-down mechanism including a first releasable locking mechanism for releasably locking said seat back in the unfolded and locked position; and a seat back angle adjustment mechanism for adjusting the angle of said seat back relative to said frame rail when said seat back is in the unfolded and locked position, said seat back angle adjustment mechanism including a second releasable locking mechanism for releasably locking said seat back at any selected one of a plurality of different angles relative to said frame rail;

said seat back fold-down mechanism enabling folding movement of said seat back between the folded position and the unfolded and locked position without releasing said second releasable locking mechanism when said seat back is locked in any selected one of the plurality of different angles relative to said frame rail;

said seat back having a length that varies as the seat back angle is adjusted.

* * * * *